(12) United States Patent
Kitamura (10) Patent No.: US 9,416,043 B2
(45) Date of Patent: *Aug. 16, 2016

(54) APPARATUS AND METHOD FOR MANUFACTURING GLASS PREFORM

(71) Applicant: FUJIKURA LTD., Koto-ku, Tokyo (JP)

(72) Inventor: Takayuki Kitamura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/521,617

(22) Filed: Oct. 23, 2014

(65) Prior Publication Data

US 2015/0052952 A1 Feb. 26, 2015

Related U.S. Application Data

(62) Division of application No. 13/165,236, filed on Jun. 21, 2011, now abandoned.

(30) Foreign Application Priority Data

Jun. 23, 2010 (JP) .................................. 2010-142837

(51) Int. Cl.
*C03B 37/014* (2006.01)
*C03B 37/018* (2006.01)

(52) U.S. Cl.
CPC ..... *C03B 37/01413* (2013.01); *C03B 37/01807* (2013.01); *C03B 37/01815* (2013.01); *C03B 2201/06* (2013.01); *C03B 2201/50* (2013.01);
(Continued)

(58) Field of Classification Search
CPC ................... C03B 37/01807; C03B 37/01815; C03B 37/01413; C03B 2201/50; C03B 2201/54; C03B 2201/06; C03B 2207/80; C03B 2207/90
See application file for complete search history.

(56) References Cited

U.S. PATENT DOCUMENTS

| | | | |
|---|---|---|---|
| 4,582,518 A | 4/1986 | Erickson | |
| 5,146,534 A | 9/1992 | Lines | |
| 2004/0057692 A1* | 3/2004 | Ball | C03B 37/01228 385/142 |

(Continued)

FOREIGN PATENT DOCUMENTS

| | | |
|---|---|---|
| CN | 1842499 A | 10/2006 |
| CN | 101495893 A | 7/2009 |

(Continued)

OTHER PUBLICATIONS

Office Action, Issued Feb. 1, 2012 by the Netherlands Patent Office, in counterpart Dutch Application No. 2006975.

(Continued)

*Primary Examiner* — Queenie Dehghan
(74) *Attorney, Agent, or Firm* — Sughrue Mion, PLLC (57) ABSTRACT

An apparatus for manufacturing a glass perform, includes: a dummy tube section, a reservoir portion, and a cooling portion; and a glass tube section in which particles of an alkali metal compound or an alkaline earth metal compound which have flowed into the glass tube section from the dummy tube section are heated by a second heat source which performs traverse, and oxides of the particles being deposited on an inner wall and dispersed in the glass tube section. In the cooling portion of the dummy tube section, vapor of the alkali metal compound or the alkaline earth metal compound generated by heating of a first heat source is cooled and condensed by a dry gas flowing into the dummy tube section, and thereby the particles are generated.

9 Claims, 4 Drawing Sheets

(52) U.S. Cl.
CPC ......... *C03B 2201/54* (2013.01); *C03B 2207/80* (2013.01); *C03B 2207/90* (2013.01)

(56) References Cited

U.S. PATENT DOCUMENTS

| 2005/0138905 A1 | 6/2005 | Kubokawa |
| 2005/0144986 A1 | 7/2005 | Bookbinder et al. |
| 2006/0112734 A1 | 6/2006 | Kim et al. |
| 2011/0314874 A1 | 12/2011 | Kitamura |

FOREIGN PATENT DOCUMENTS

| JP | 59-013453 B | 3/1984 |
| JP | 59-014412 B | 4/1984 |
| JP | 63040744 A | 2/1988 |
| JP | 63288926 A | 11/1988 |
| JP | 04-075857 B | 12/1992 |
| JP | 648775 A | 2/1994 |
| JP | 2002-528379 A | 9/2002 |
| JP | 2005537210 A | 12/2005 |
| JP | 2007-504080 A | 3/2007 |
| JP | 2007-513862 T | 5/2007 |
| JP | 2007-516829 T | 6/2007 |
| JP | 2007516929 A | 6/2007 |
| JP | 20126779 A | 1/2012 |
| WO | 86/04573 A1 | 8/1986 |
| WO | 00/26151 | 5/2000 |
| WO | 2005/021455 A2 | 3/2005 |
| WO | 2005/058765 A1 | 6/2005 |
| WO | 2005/065803 A1 | 7/2005 |
| WO | 2005066084 A1 | 7/2005 |
| WO | 2006/068941 A2 | 6/2006 |
| WO | 2009/034413 A1 | 3/2009 |

OTHER PUBLICATIONS

Communication issued by the Patent Office of the People's Republic of China in Chinese Application No. 201110186454.9 dated Jul. 11, 2013.
Notice of Reasons for Rejection issued by the Japanese Patent Office in Japanese Patent Application No. 2010-142837 dated Jan. 14, 2014.
Communication from United States Patent and Trademark Office issued Feb. 12, 2013 in U.S. Appl. No. 13/233,654.
Communication from United States Patent and Trademark Office issued Jun. 27, 2013 in U.S. Appl. No. 13/233,654.
Communication from United States Patent and Trademark Office issued Jan. 17, 2013 in U.S. Appl. No. 13/165,236.
Communication dated Apr. 1, 2014, from the Japanese Patent Office in counterpart application No. 2010-206612.
Communication dated Jun. 24, 2014, from the Japanese Patent Office in counterpart application No. 2010-206612.

* cited by examiner

| SUBSTANCE | MELTING POINT/°C | BOILING POINT/°C |
|---|---|---|
| NaCl | 801 | 1413 |
| NaBr | 755 | 1390 |
| NaOH | 318 | 1390 |
| KCl | 776 | 1420 (SUBLIMATION) |
| KBr | 731 | 1435 |
| KOH | 360 | 1320 |
| $KNO_3$ | 333 | 400 (DECOMPOSITION) |
| $MgCl_2$ | 714 | 1412 |
| $CaCl_2$ | 772 | 1935 |

APPARATUS AND METHOD FOR MANUFACTURING GLASS PREFORM

CROSS-REFERENCE TO RELATED APPLICATION

This is a divisional application based upon U.S. patent application Ser. No. 13/165,236, filed Jun. 21, 2011 and claims the benefit of priority from Japanese Patent Application No. 2010-142837, filed Jun. 23, 2010, the disclosure of which is incorporated herein in its entirely by reference.

BACKGROUND OF THE INVENTION

1. Field of the Invention

The present invention relates to an apparatus and a method for manufacturing a glass preform, which can accurately control the concentration of an additive with low consumption of energy, and particularly, to an apparatus and a method for manufacturing a glass preform which is adapted to manufacture a low-loss optical fiber.

2. Background Art

Optical fibers produced using silica glass in which alkali metal oxide or alkaline earth metal oxide is doped has been shown by a number of predecessors to reduce the transmission loss thereof.

However, a technique for industrially mass-producing such optical fibers is incomplete.

In order to use a hydrolysis reaction or a thermal oxidation reaction caused by oxygen in gaseous phase in a conventional method for manufacturing an optical fiber, it is necessary to use, for example, gaseous raw materials, such as silicon tetrachloride ($SiCl_4$) or germanium tetrachloride ($GeCl_4$).

However, alkali metal ions or an alkaline earth metal ion which are so-called hard cations form very strong ionic bonds.

For this reason, most of compounds (salts) formed by such bonds becomes solid at around ambient temperature and ambient pressure.

Accordingly, since the salts which become gas are hardly formed, it is difficult to apply the salts to the manufacture of optical fibers.

Therefore, in order to commercially produce optical fibers in which alkali metal oxide or alkaline earth metal oxide is doped, a manufacturing method different from the methods conventionally established in this field should be developed.

Various attempts have been taken in regard to such problems.

For example, a method of utilizing the characteristic that an alkali metal compound or an alkaline earth metal compound is easily soluble in water, mixing an aqueous solution of the alkali metal compound in the form of an aqueous mist in a source gas to introduce the mist into an oxyhydrogen flame, and performing hydrolysis simultaneously with other raw materials to form glass has been attempted (for example, refer to Japanese Examined Patent Application, Second Publication No. S59-13453 and Japanese Examined Patent Application, Second Publication No. S59-14412).

Additionally, a technique of spraying the alkali metal compound onto an over-cladding as an aqueous solution simultaneously with a plasma-enhanced chemical vapor deposition method is disclosed in PCT International Publication No. WO 2009/034413.

Additionally, it is known that some composite salts obtained by reacting certain kinds of alkali metal salts and other metal salts with each other have vapor pressures higher than that of original alkali metal salts. The attempt to use these composite salts as raw materials is also performed (for example, refer to Japanese Patent No. 1787027).

Moreover, in recent years, a method of strongly heating an alkali metal or alkaline earth metal halide to generate alkali metal vapor, exposing an optical fiber precursor glass to this alkali metal vapor, and doping alkali metal to the glass has been attempted (for example, refer to Published Japanese Translation No. 2007-516829 of PCT International Publication and Published Japanese Translation No. 2007-513862 of PCT International Publication, and PCT International Publication No. WO 2006/068941).

The above-described methods of using an aqueous solution of an alkali metal compound or an alkaline earth metal compound are objectionable manufacturing methods from the viewpoint that mixing of moisture which causes an increase in loss in manufacture of optical fibers should be ordinary avoided.

Additionally, in the above-described method of forming composite salts with higher vapor pressure and introducing the composite salts as vapor, the degree of rise in the vapor pressure is small, and the advantage is very restricted. Since some extra chemical species which are ordinary unnecessary for the function of an optical fiber are added in the manufacturing method, there is a concern that a rise in the transmission loss is brought about.

Moreover, the method of strongly heating an alkali metal compound or an alkaline earth metal compound and obtaining alkali metal vapor has an indefinite reaction mechanism of a reduction reaction, and is deficient in practice.

SUMMARY OF THE INVENTION

The invention has been devised in view of such a conventional situation, and the first object of the invention is to provide an apparatus for manufacturing a glass preform which can accurately control the concentration of an additive in the glass preform.

Additionally, the second object of the invention is to provide a method for manufacturing a glass preform in which the concentration of an additive in the glass preform is accurately controlled with low consumption of energy.

An apparatus for manufacturing a glass perform of the first aspect of the invention, includes: a dummy tube section having a first end through which a dry gas containing oxygen is introduced, a second end opposite to the first end, a reservoir portion, in which an alkali metal compound or an alkaline earth metal compound is placed, heated by a first heat source, and a cooling portion; and a glass tube section provided at the second end of the dummy tube section and having an inner wall, in which particles of the alkali metal compound or the alkaline earth metal compound which have flowed into the glass tube section from the dummy tube section are heated by a second heat source which performs traverse, and oxide of the particles being deposited on the inner wall and dispersed in the glass tube section. In the cooling portion of the dummy tube section, vapor of the alkali metal compound or the alkaline earth metal compound generated by heating with the first heat source is cooled and condensed by the dry gas flowing into the dummy tube section between the reservoir portion and the second end, and thereby the particles are generated.

In the apparatus for manufacturing a glass perform of the first aspect of the invention, it is preferable that the vapor of the alkali metal compound or the alkaline earth metal compound be cooled to the melting point or lower thereof in the cooling portion.

In the apparatus for manufacturing a glass perform of the first aspect of the invention, it is preferable that the particle diameter of the particles be less than or equal to 100 μm.

In the apparatus for manufacturing a glass perform of the first aspect of the invention, it is preferable that the glass tube section be provided at the second end of the dummy tube section via a connection component.

It is preferable that the apparatus for manufacturing a glass perform of the first aspect of the invention further include: a cladding layer having a refractive index to be formed on an inner peripheral of the glass tube section such that the cladding layer is directly adjacent to the inner wall of the glass tube section; and a core layer having a refractive index that is greater than the refractive index of the cladding layer to be formed at a position of an inner periphery of the glass tube section such that the core layer is directly adjacent to the cladding layer.

A method for manufacturing a glass preform of the second aspect of the invention, includes: preparing a dummy tube section and a glass tube section, the dummy tube section having a first end and a second end opposite to the first end, the glass tube section having an inner wall and being provided at the second end of the dummy tube section; arranging an alkali metal compound or an alkaline earth metal compound in the dummy tube section; heating and vaporizing the alkali metal compound or the alkaline earth metal compound at a predetermined temperature using a first heat source; allowing a dry gas containing oxygen to flow into the dummy tube section from the first end of the dummy tube section; cooling and condensing vapor of the alkali metal compound or the alkaline earth metal compound with movement of the dry gas in the dummy tube section, and thereby generating particles of the alkali metal compound or the alkaline earth metal compound; heating the particles of the alkali metal compound or the alkaline earth metal compound carried to the glass tube section with the movement of the dry gas by use of a second heat source which performs traverse; and making oxides of the alkali metal compound or the alkaline earth metal compound be deposited on the inner wall of the glass tube section and dispersed inside the glass tube section.

In the method for manufacturing a glass preform of the second aspect of the invention, it is preferable that the vapor of the alkali metal compound or the alkaline earth metal compound be cooled to the melting point or lower thereof.

In the method for manufacturing a glass preform of the second aspect of the invention, it is preferable that the particle diameter of the particles be less than or equal to 100 μm.

In the method for manufacturing a glass preform of the second aspect of the invention, it is preferable that the alkali metal compound or the alkaline earth metal compound be halide.

In the method for manufacturing a glass preform of the second aspect of the invention, it is preferable that the halide be either chloride or bromide.

In the method for manufacturing a glass preform of the second aspect of the invention, it is preferable that the chloride be either potassium chloride or sodium chloride.

In the method for manufacturing a glass preform of the second aspect of the invention, it is preferable that the bromide be potassium bromide.

In the method for manufacturing a glass preform of the second aspect of the invention, it is preferable that the alkali metal compound be potassium chloride, a dry gas heated at 80° C. to 120° C. be allowed to flow into the dummy tube section, and the predetermined temperature be approximately 100° C. higher than the melting point of the potassium chloride, and the particles be heated at temperature in the range of 1100° C. to 1850° C.

It is preferable that the method for manufacturing a glass preform of the second aspect of the invention further include: allowing a source gas containing $SiCl_4$ with or without a dopant gas to flow into the glass tube section; depositing $SiO_2$ with or without a dopant on the inner wall of the glass tube section by heating a part of the glass tube section such that the glass tube section includes a cladding layer having a refractive index to be formed on an inner peripheral of the glass tube section such that the cladding layer is directly adjacent to the inner wall of the glass tube section and a core layer having a refractive index that is greater than the refractive index of the cladding layer to be formed at a position of an inner periphery of the glass tube section such that the core layer is directly adjacent to the cladding layer.

Effects of the Invention

In the apparatus for manufacturing a glass preform of the first aspect of the invention, the dummy tube section has the cooling portion provided between the reservoir portion and the second end.

By the heating with the first heat source, the vapor of the alkali metal compound or the alkaline earth metal compound is generated.

In the cooling portion, the vapor generated as described above is cooled and condensed into particles due to the dry gas flowing into the dummy tube section.

Thus, in the apparatus for manufacturing a glass preform of the first aspect of the invention, a raw material which is turned into particles while moving from the reservoir portion to the glass tube section through the cooling portion is stably and constantly supplied.

Therefore, the apparatus for manufacturing a glass preform of the invention contributes to manufacturing a glass preform in which the concentration of an additive is accurately controlled.

In a method for manufacturing a glass preform of the second aspect of the invention, the vapor of the alkali metal compound or the alkaline earth metal compound is converted into particles in the cooling portion provided between the reservoir portion and the second end of the dummy tube section.

The particles become an aerosol with the dry gas, pass through the cooling portion, and are carried to the glass tube section.

Therefore, according to the invention, a method for manufacturing a glass preform, which can promote the stable growth of a glass preform under the atmosphere in which the concentration of an additive is accurately controlled, is obtained.

DESCRIPTION OF THE PREFERRED EMBODIMENTS

Hereinafter, an embodiment of the invention will be described in detail with reference to the drawings.

Figure 1:
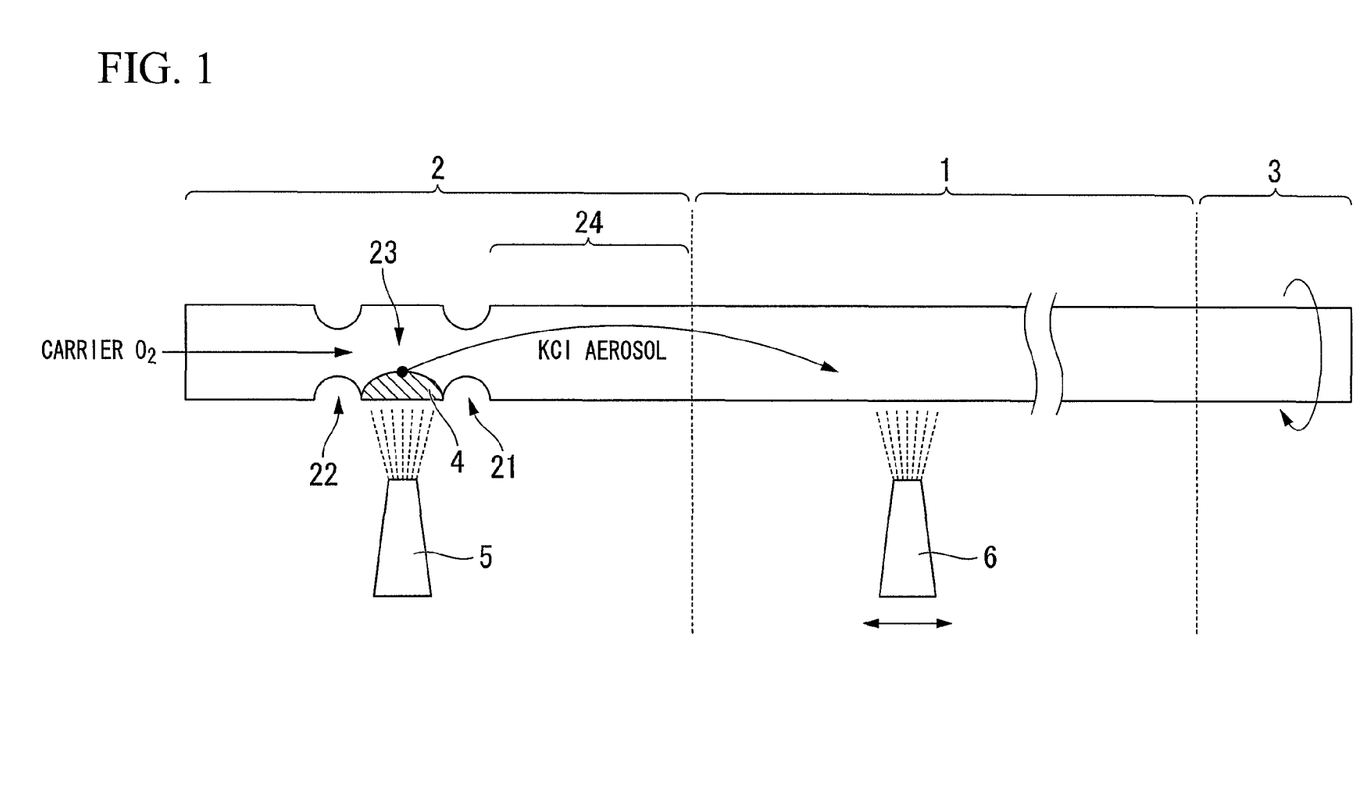
FIG. 1 is a view showing the configuration of an apparatus for manufacturing a glass preform according to an embodiment of invention.

FIG. 1 is a view showing the configuration of an apparatus for manufacturing a glass preform according to an embodiment of the invention.

As shown in FIG. 1, the apparatus for manufacturing a glass preform includes a glass tube section 1, a first dummy tube section 2, and a second dummy tube section 3.

The glass tube section 1 is made of pure synthetic silica ($SiO_2$) glass which does not substantially contain impurities, such as transition metals, and has a length of, for example, 800 mm.

The first dummy tube section 2 and the second dummy tube section 3 are fusion-spliced to both ends of the glass tube section 1, and have a length of, for example, 500 mm.

In this way, a glass tube in which the glass tube section 1, the first dummy tube section 2, and the second dummy tube section 3 are integrally formed is referred to as a "composite glass tube".

Both ends of the composite glass tube are attached to a typical lathe (not shown) for forming modified chemical vapor deposition (MCVD) glass.

In addition, the glass tube section, the first dummy tube section, and the second dummy tube section may be connected together via connection components, and the portions at both ends of the glass tube section in which the glass tube section, in which the first dummy tube section, and the second dummy tube section are integrally manufactured in advance, may be referred to as dummy tube sections for convenience.

Additionally, a part of the first dummy tube section 2 which allows a source gas to flow therethrough is provided with a first recessed portion 21 and a second recessed portion 22.

Specifically, by heating an upstream position in the first dummy tube section 2 apart from a connecting portion (a second end) between the glass tube section 1 and the first dummy tube section 2 by a predetermined distance (for example, 300 mm), the first dummy tube section 2 is contracted (the diameter of the first dummy tube section 2 is reduced), and a first recessed portion 21 having a predetermined width (for example, 10 mm) is formed in the first dummy tube section 2.

Additionally, by using the same method of forming the first recessed portion 21, the second recessed portion 22 having a predetermined width is provided at an upstream position separated from the first recessed portion 21 by a predetermined interval (for example, 50 mm).

As a result, a portion which is inside of the first dummy tube section 2 and between the first recessed portion 21 and the second recessed portion 22 is defined as a reservoir portion 23.

A predetermined amount (for example, 3 g) of potassium chloride 4 (KCl) (melting point is 776° C.) is placed in the reservoir portion 23 in a state of being a solid.

In addition, a portion of the first dummy tube section 2 and from the connecting portion between the glass tube section 1 and the first dummy tube section 2 to the first recessed portion 21 is defined as a cooling portion 24.

Additionally, an end (a first end) is provided at a position opposite to the connecting portion (the second end) between the first dummy tube section 2 and the glass tube section 1.

Dry oxygen can flow into the inside of the composite glass tube from this end (the first end).

Additionally, the apparatus for manufacturing a glass preform shown in FIG. 1 includes a first oxyhydrogen burner 5 and a second oxyhydrogen burner 6.

The first oxyhydrogen burner 5 is used in order to heat the reservoir portion 23 from the outside of the reservoir portion 23.

Additionally, the second oxyhydrogen burner 6 is used in order to heat the inside of the glass tube section 1 from the outside of the glass tube section 1 while traversing along the overall length (longitudinal direction) of the glass tube section 1.

In the invention, "traverse" means being relatively moved parallel to the longitudinal direction (axial direction) of the glass tube section 1.

For this reason, as will be described below, the "performing traverse of the second oxyhydrogen burner 6" means relatively moving the second oxyhydrogen burner 6 in the longitudinal direction of the glass tube section 1.

Figure 2:
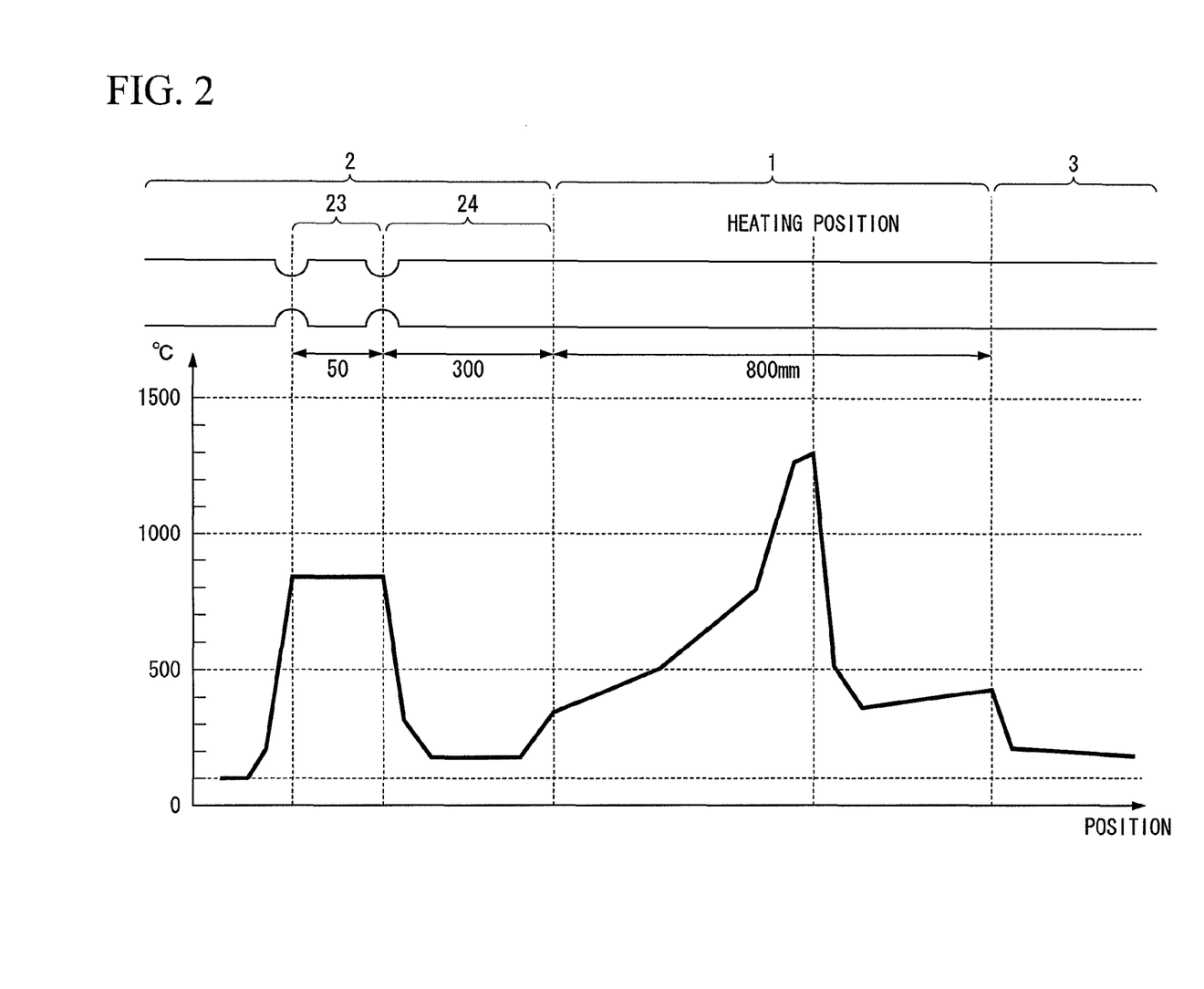
FIG. 2 is a view showing the temperature profile along the longitudinal direction of the outer surface of a composite glass tube, which is measured by an infrared thermometer in a case where a method for manufacturing a glass preform according to an embodiment of the invention is executed.

FIG. 2 is a view showing the temperature profile along the longitudinal direction of the outer surface of the composite glass tube, which is measured by an infrared thermometer in a case where a method for manufacturing a glass preform according to an embodiment of the invention is executed.

Hereinafter, the method for manufacturing a glass preform according to an embodiment of the invention will be described with reference to FIGS. 1 and 2.

First, while rotating a composite glass tube, the dry oxygen heated to a certain temperature in the range of 80° C. to 120° C. is allowed to flow into the inside of the first dummy tube section 2 from the end (the first end) thereof at a predetermined flow velocity (for example, 1.65 SLM (standard volume L/min)).

In this state, the reservoir portion 23 is heated approximately at 780° C. using the first oxyhydrogen burner 5 which is a heat source, and potassium chloride 4 (KCl) is melted.

The heated dry oxygen further flows for 10 minutes or more at a predetermined flow velocity while potassium chloride 4 is being melted, and potassium chloride 4 is thereby dried.

Next, the reservoir portion 23 is cooled, and a state where the vapor of potassium chloride is not substantially generated is obtained. Thereafter, pure silica glass is formed on the inner wall of the glass tube section 1 by a conventional MCVD method.

Next, while the dry oxygen heated at a certain temperature in the range of 80° C. to 120° C. flows at a predetermined flow velocity (for example, 1.65 SLM) in the composite glass tube, the glass outer surface of the reservoir portion 23 is again heated at a certain temperature in the range of 780° C. to 950° C. by the first oxyhydrogen burner 5.

Then, potassium chloride 4 in the reservoir portion 23 melts, and a part thereof becomes vapor according to vapor pressure thereof at the heating temperature.

Since the vapor of potassium chloride is not substantially generated in heating of the melting point or lower, it is required to perform heating such that the heating temperature becomes higher than or equal to the melting point.

In addition, as shown in the examples that will be described below, as the heating temperature at this time, a temperature range which is approximately 100° C. higher than the melting point of potassium chloride, that is, 780° C. to 900° C. is more preferable.

The vapor of potassium chloride 4 generated in this way is immediately cooled and condensed into a particulate solid by the flowing lower-temperature oxygen, and is carried as an aerosol into the glass tube section 1 by the flow of the oxygen gas.

The temperature profile of FIG. 2 shows a case where the lengths of the reservoir portion 23, the cooling portion 24, and the glass tube section 1 are 50 mm, 300 mm, and 800 mm, respectively.

As shown in FIG. 2, it is understood that, if the cooling portion 24 with a length of approximately 300 mm is provided, the outer surface of the composite glass tube is sufficiently cooled until the temperature thereof becomes 100° C. or lower.

However, this is a sufficient value, and if potassium chloride 4 is cooled such that the temperature of potassium chloride 4 becomes the melting point or lower thereof, a particle forming phenomenon required to obtain the effect of the invention occurs.

In addition, at this time, if scattering of indoor light is observed, it is clear that particles with a particle diameter of approximately 200 nm or more are contained within the composite glass tube.

On the other hand, large and coarse particles greater than approximately 100 μm in particle diameter do not reach the glass tube section 1, but subside immediately and dissolve in the melted potassium chloride 4 at the reservoir portion 23 or deposit on the inner wall of the first dummy tube section 2.

After the carrying of the particles of potassium chloride 4 is brought into a steady state, the outer surface of the glass tube section 1 is heated to a certain temperature in the range of 1100° C. to 1850° C. while the second oxyhydrogen burner 6 serving as a heat source is traversed with respect to the glass tube section 1 at a predetermined speed (for example, approximately 100 mm/min) toward the downstream from the upstream of a gas stream.

In addition, as shown in the examples which will be described below, it is more preferable to heat the outer surface of the glass tube section in the range of 1300° C. to 1850° C.

FIG. 2 shows a case where the outer surface of the glass tube section 1 is heated such that the temperature thereof becomes 1300° C.

At this stage, it is considered that the particles of potassium chloride 4 are thermally oxidized by oxygen in gaseous phase, and are deposited on the inner wall of the glass tube section 1 as potassium oxide ($K_2O$) and simultaneously dispersed inside the glass tube section 1.

In addition, the heating by the traverse of the second oxyhydrogen burner 6 is not limited to one time of traverse.

As described below, the heating by the traverse may be performed two or more times such that the concentration of potassium oxide reaches a desired concentration and potassium oxide is doped in silica glass.

After such traverse heating by the second oxyhydrogen burner 6, the heating of the reservoir portion 23 is stopped, the reservoir portion 23 is cooled, and generation of potassium chloride vapor is stopped.

Finally, the glass tube section 1 which is produced in this way is contracted using a conventional technique, and is collapsed into a solid glass rod.

As described above, in the embodiment of the apparatus and method for manufacturing a glass preform of the invention, high-temperature vapor of potassium chloride 4 is generated by the heating by the first oxyhydrogen burner 5, this vapor is immediately cooled and condensed into a particulate solid by the lower-temperature oxygen flowing into the composite glass tube in the portion of the cooling portion 24, and is carried as an aerosol into the glass tube section 1 by oxygen gas.

At this time, the vapor pressure of the vapor of the potassium chloride 4, that is, the generation amount of the vapor can be controlled by adjusting the heating temperature of potassium chloride 4.

Additionally, since the agglomeration rate can be controlled by adjusting the temperature, flow rate, and flow velocity of a carrier gas, that is, oxygen gas, the concentration, the particle diameter, and the like of the potassium chloride particles in the aerosol can be easily controlled.

Therefore, if the particle diameter or the like of the particles in the aerosol can be substantially controlled, the addition (dope) concentration of potassium oxide to be introduced into the inside of the glass tube section 1 can be accurately controlled.

Additionally, according to this method, since any compounds containing water or hydrogen atoms are not used, generation of a hydroxyl group (OH) within the glass to be synthesized can be suppressed.

Moreover, it is possible to manufacture silica glass in which potassium oxide is doped, without generating potassium metal vapor by strong heating, and it is possible to manufacture optical fibers with lower consumption of energy.

Hence, if optical fibers are produced using the glass preform manufactured by the manufacturing apparatus and method of the present embodiment, low-loss optical fibers can be more inexpensively produced.

In addition, in the above embodiment, potassium chloride is adopted as the compound (salt) and potassium oxide is adopted as the additive. However, the invention is not limited to these materials.

That is, as the metal, alkali metals, such as lithium, sodium, potassium, rubidium, and cesium, or alkaline earth metals, such as beryllium, magnesium, calcium, strontium, and barium, can be adopted.

Additionally, as the compound, halide (chloride, bromide, fluoride, and iodide), sulfide, carbonate, hydrogencarbonate, or the like can be adopted.

From the viewpoint of which material is adopted as a raw material among the above materials, a raw material is appropriately selected on the basis of substance-specific physical properties, such as the melting points, the vapor pressure at each temperature, and the heat capacity of vapor of the above materials.

In the dispersion of the particles in the aerosol, the volume for which the particles account rather than the molecular weight has a decisive influence on the dispersed state.

For this reason, it is more important to accurately control the particle diameter of the particles generated by the method mentioned here.

In addition, as the compound, it is also possible to use hydroxide, hydride, and the salts of organic acid or the like.

Since such compounds contain hydrogen in the molecules, and may cause generation of OH group within the glass, it is not necessarily preferable to use such compounds. However, the same effect can be expected by adding an additional dehydration process.

Additionally, although the dry oxygen is allowed to flow in the above-described embodiment, the dry oxygen is not necessarily pure oxygen and has only to be dried gas containing oxygen.

Additionally, in the above-described embodiment, the conventional MCVD method is adopted and the oxyhydrogen burners are used as two heating devices.

On the other hand, instead of using a flame by the oxyhydrogen burner as a heating device, heating devices, such as an electric furnace and a plasma heating, may be used, or the combination of plural heating devices may be applied for heating.

Low-loss optical fibers are expected to be produced by manufacturing optical fibers using silica glass to which alkali metal oxide or alkaline earth metal oxide is added according to the procedure mentioned above.

In order to manufacture an optical fiber from this glass preform, an appropriate glass tube section 1 is prepared by using a conventional general method before corrapsing.

Specifically, for example, first, a source gas containing $SiCl_4$ flows into the composite glass tube, and silicon dioxide ($SiO_2$) is deposited on the inner wall of the glass tube section 1 by heating the glass tube section 1 at a desired temperature while traverse of a heat source is performed.

Next, a source gas containing $GeCl_4$ in addition to $SiCl_4$ (dopant gas) flows into the composite glass tube, and $SiO_2$ to which germanium dioxide ($GeO_2$, dopant) is added so as to directly adjacent to $SiO_2$ previously deposited within the glass tube section 1 by heating the glass tube section 1 at a desired temperature while traverse of a heat source is performed.

Alternatively, a source gas containing silicon tetrafluoride ($SiF_4$, dopant gas) in addition to $SiCl_4$ flows into the composite glass tube, and $SiO_2$ to which fluorine is added is deposited on the inner wall of the glass tube section 1 by heating the glass tube section 1 at a desired temperature while traverse of a heat source is performed.

Next, a source gas containing $SiCl_4$ flows into the composite glass tube, and the glass tube section 1 is heated at a desired temperature while traverse of a heat source is performed.

Therefore, $SiO_2$ is deposited so as to directly adjacent to $SiO_2$ to which fluorine (dopant) is added to which previously deposited within the glass tube section 1.

Therefore, when optical fibers are manufactured in a post process, the glass tube section 1 having a suitable refractive index profile which exhibits the respective functions of a cladding and a core is prepared.

By using the glass tube section 1 which mentioned above alkali metal oxide or alkaline earth metal oxide is added by the above-described manufacturing apparatus or method.

Glass can be further added to the outer peripheral portion of the silica glass rod to which alkali metal oxide or alkaline earth metal oxide is added by the above-described manufacturing apparatus or method, by a conventional general method, for example, an outside vapor deposition method, a rod in cylinder (RIC) method, or the like, such that an external shape of the resulting glass preform having a desired core/cladding ratio is obtained.

Alternatively, the glass of the outer peripheral portion can also be shaved off by applying a conventional general method, for example, mechanical shaving or grinding, dissolution by fluoric acid, or the like such that an external shape of the resulting glass preform having a desired core/cladding ratio is obtained.

Next, elongation may be made to a desired diameter by a conventional method, and fiber drawing may be performed by a conventional method.

A person skilled in the art can select these methods freely.

Hereinafter, with respect to the apparatus and method for manufacturing a glass preform, several exemplary embodiments based on various specific values are shown.

Example 1

A glass tube (Suprasil-F300 made by Shin-Etsu Quartz Products Co. Ltd.) of pure synthetic silica glass which contains a hydroxyl group of less than 1 ppm, iron ions of less than 0.005 ppm, and aluminum ions of less than 0.05 ppm, and has an external diameter of 32 mm, a thickness of 2.5 mm, and a length of 800 mm was adopted as a glass tube section 1.

Additionally, dummy tubes made of pure synthetic silica glass which have a length of approximately 500 mm and have the same external diameter and thickness as those of the glass tube section 1 were adopted as a first dummy tube section 2 and a second dummy tube section 3.

Additionally, a first recessed portion 21 was provided at the upstream position apart from a joining portion between the first dummy tube section 2 and the glass tube section 1 by approximately 300 mm so as to have a width of approximately 10 mm.

Additionally, a second recessed portion 22 was provided at the upstream position apart from the first recessed portion 21 by approximately 50 mm so as to have a width of approximately 10 mm.

Additionally, potassium chloride 4 was put into the reservoir portion 23 is made by Tri Chemical Laboratories Inc., and has the purity of 99.999% or more and a weight of approximately 3 g.

The heating temperature of dry oxygen was set to 100° C., and the flow velocity was set to 1.65 SLM (standard volume L/min).

Additionally, the temperature for temporarily vaporizing potassium chloride 4 by a first oxyhydrogen burner 5 was set to approximately 850° C. to 900° C. (approximately 100° C. higher than the melting point).

Additionally, the glass tube section 1 was heated while being rotated by traversing a second oxyhydrogen burner 6 with respect to the glass tube section 1.

At this time, the outer surface temperature of the glass tube section 1 was set to 1300° C., and the traverse speed was set to approximately 100 mm/min.

Moreover, potassium oxide was doped by performing the traverse three times.

The glass tube section 1 produced in this way was contracted and collapsed by a conventional method, and a solid glass rod was thereby obtained.

Example 2

The outer surface temperature of the glass tube section 1 which was heated by performing traverse of the second oxyhydrogen burner 6 was set to 1500° C., and a glass preform was manufactured similarly to Example 1.

Example 3

The outer surface temperature of the glass tube section 1 which was heated by performing traverse of the second oxyhydrogen burner 6 was set to 1700° C., and a glass preform was manufactured similarly to Example 1.

Example 4

The outer surface temperature of the glass tube section 1 which was heated by performing traverse of the second oxyhydrogen burner 6 was set to 1850° C., and a glass preform was manufactured similarly to Example 1.

Comparative Example 1

On the other hand, as a comparative example contrasted to the above Examples 1 to 4, the outer surface temperature of the glass tube section 1 which was heated by performing traverse of the second oxyhydrogen burner 6 was set to 1000° C.

At this time, although crystal-like particles were deposited on the inner wall of the glass tube section 1, it was considered that, since these particles were microcrystals of potassium chloride, most of the potassium chloride was not oxidized to potassium oxide.

In order to cool the reservoir portion 23 similarly to Example 1, and then remove the unreacted potassium chloride deposited within the glass tube section 1, the glass tube section 1 was heated to 1000° C. by the second oxyhydrogen burner 6, and the traverse was performed once.

The glass tube section 1 produced in this way was contracted and collapsed similarly to the above method, and a solid glass rod was thereby obtained.

Comparative Example 2

The reservoir portion 23 was not provided in the composite glass tube used in Example 1, addition of potassium chloride was not performed, and a glass rod was produced through other processes.

The refractive index profile of the glass rods produced as described above was measured by a preform analyzer.

Figure 3:
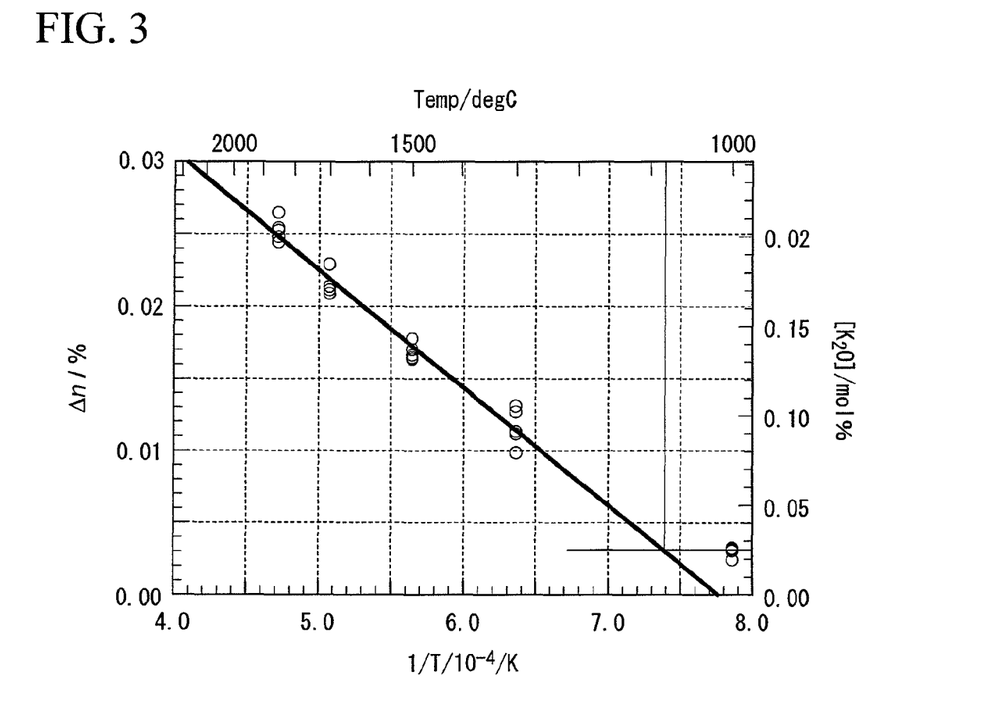
FIG. 3 is a view showing the results of each of examples in a case where the outer surface temperature of a glass tube section which is heated by traversing a second oxyhydrogen burner is varied.

When the percentages of the refractive index change of the central portions of the glass rods produced in Examples 1 to 4 and Comparative Example 1 with respect to the refractive index of pure silica of the central portion of the glass rod produced in Comparative Example 2 were plotted as a function of the heating temperature of the glass tube section 1, a graph of FIG. 3 was obtained.

It is generally known that, if the concentration of an additive to be added to silica glass is low, the refractive index change is proportional to the concentration of the additive.

According to Non-patent Document (J. Schroeder, J. Non-Cryst., Solids, Vol. 40, p. 549 (1980)), it is reported that the proportional factor of the refractive index change caused by the addition of potassium oxide is $+1.8 \times 10^{-3}$ [$\Delta$/mol %], and the addition concentration of potassium oxide which is converted using the proportional factor reported in the Non-patent Document is shown on the right axis.

As shown in FIG. 3, when the percentages of the refractive index change were plotted with respect to the inverse of the temperature, good linearity was obtained within a heating temperature range of 1300° C. or higher of the glass tube section 1.

When the heating temperature was 1000° C., the values of the percentages of the refractive index change did not become 0 (zero).

As shown by an auxiliary line in FIG. 3, it is understood that, in a heating temperature range of 1100° C. or higher, the refractive indexes, and the addition concentration of potassium oxide added to the glass can be accurately predicted from the heating temperature.

Additionally, although it is believed that an oxidation reaction in which potassium chloride in gaseous phase is oxidized to potassium oxide does not proceed at a heating temperature of 1100° C. or lower, it is believed that the refractive index change appears since a portion of potassium chloride deposited while remaining unreacted on the wall of the glass was dispersed and incorporated in the glass.

Example 5

The heating temperature of the reservoir portion 23 was set to approximately 900 to 950° C. (higher than the melting point by 100° C. or higher), and the glass tube section 1 was heated similarly to Example 2 at 1500° C. by the second oxyhydrogen burner 6 while traversing the glass tube section 1.

At this time, since scattering of indoor light was observed within the composite glass tube, it is clear that particles with a particle diameter of approximately 200 nm or more were contained.

However, particles of 1 mm or less which were not observed in Examples 1 to 4 were observed on the inner wall of the glass tube section 1 after deposition, and a state where a large number of particles were deposited in a granule form having approximately 10 to 100 µm even in such particles was confirmed.

As a result, it is believed that potassium chloride particles with relatively larger diameter were carried.

In addition, in this Example, after traverse was performed three times, the glass tube section 1 was collapsed into a solid glass rod using a conventional technique.

Although the most part of the granular deposition substance dissipated due to the heating in the collapsing process, a portion thereof remained in the glass as crystalline defects.

That is, this granular deposition substance becomes large and coarse particles of potassium chloride covered with potassium oxide, in which only the surfaces thereof were oxidized and the insides thereof were unreacted. The granular deposition substance was deposited and produced on the inner wall of the glass tube section 1. This is because, it can be inferred that the heating temperature of the reservoir portion 23 was so high and the concentration of the generated potassium chloride vapor was so high, that the generated large and coarse particles of potassium chloride were carried to the heated glass tube section 1, as a result, the above-described granular deposition substance was deposited and produced.

Although the potassium chloride particles having a relatively small particle diameter deposited on the inner wall of the glass tube section 1 are oxidized to potassium oxide while being dispersed in the glass by the heating of the collapsing process, it is inferred that the potassium chloride particles with a large particle diameter remained as crystals.

Next, it is believed that it is possible to add potassium oxide such that any concentration is obtained by increasing the number of times that traverse of the second oxyhydrogen burner 6 is performed.

For this reason, the following examples were performed.

Example 6

The heating temperature of the reservoir portion 23 was set to approximately 780 to 850° C. (higher than the melting point by approximately 100° C. or lower), and the glass tube section 1 was heated similarly to Example 1 at 1300° C. by the second oxyhydrogen burner 6 while traversing the glass tube section.

The glass tube section 1 in which the number of times by which traverse was performed was changed, i.e., the glass tube section in which the number of times by which traverse was performed was 3 times, 7 times, and 10 times, was prepared, and was collapsed into a solid glass rod using a conventional technique.

The refractive index profile of the glass rods produced as described above was measured by a preform analyzer.

Figure 4:
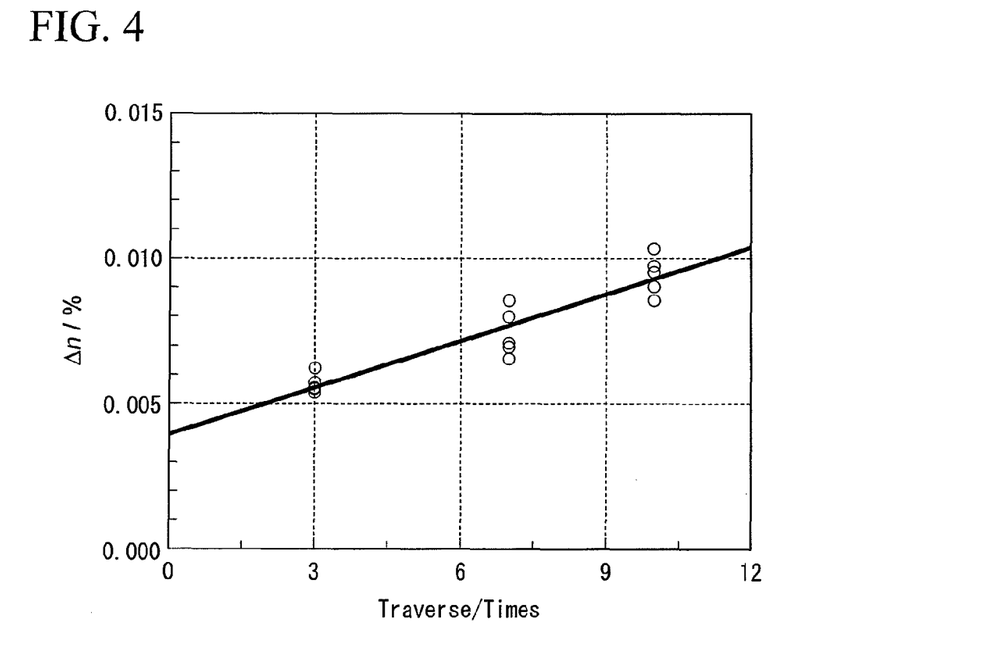
FIG. 4 is a view showing the result of each of the examples in a case where the number of times of traversing the second oxyhydrogen burner is changed.
Figure 5:
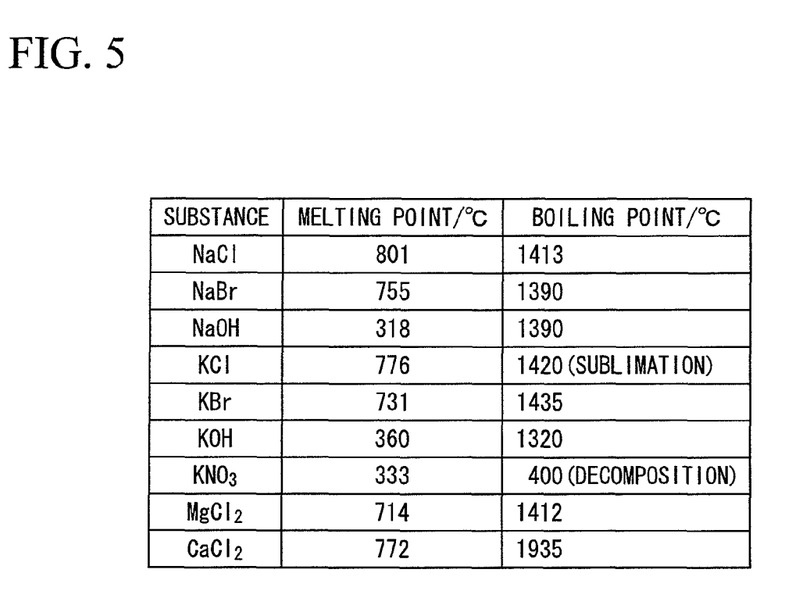
FIG. 5 is a view showing the melting points and boiling points of various substances as a table.

When the percentages of the refractive index change of the central portion of the glass rod produced in Example 6 with respect to the refractive index of pure silica of the central portion of the glass rod produced in Comparative Example 2 was plotted as a function of the number of times by which traverse was performed, a graph of FIG. 4 was obtained.

In the above-described Examples 1 to 4 and Comparative Example 1, glass was produced by setting the number of times by which traverse was performed to 3 times and changing the heating temperature of the glass tube section 1. However, in the present example, glass was produced by fixing the heating temperature to 1300° C. and changing the number of times by which traverse was performed.

Additionally, since glass was produced by lowering the temperature of the reservoir portion 23 and lowering the concentration of the potassium chloride particles to be generated, it is considered that scattering of light is hardly recognized in the gaseous phase which flows into the inside of the composite glass tube, and potassium chloride is carried as particles with a particle diameter of approximately 100 nm or less.

Generally, in the aerosol, dispersibility improves as the particle diameter becomes smaller. Therefore, as the potassium chloride particles with a smaller particle diameter are carried, it is expected that more uniform special profile of potassium chloride is expected. As a result, more uniform addition of potassium oxide to the glass can be expected.

Additionally, since the specific surface area of particles increases as the particle diameter becomes smaller, thermal oxidation reaction by oxygen in gaseous phase is expected to proceed efficiently. Therefore, there is no scientific limitation in the particle diameter of particles being small.

However, in order to obtain particles with a small particle diameter, it is necessary for the concentration of vapor to be lowered, and the adding rate of oxide, that is, production rate may be inferior.

In practice, the additive amount of potassium oxide in the case of Example 6 where the number of times by which traverse is performed is 3 times is reduced by half from the case of Example 1 where the heating temperature of the glass tube section 1 is same and the heating temperature of the reservoir portion 23 is high.

However, in the design of an optical fiber in which the addition concentration should be accurately controlled, a slight amount of potassium oxide must be added at every traverse. Therefore, the heating temperature of the reservoir portion 23 is low, and it also becomes conversely a predominant point that only a slight amount of potassium oxide can be added.

The linear relationship in FIG. 4 was obtained as can be easily imagined by a person skilled in the art that the addition concentration of potassium oxide can be controlled in proportion to the number of times by which traverse is performed.

Additionally, while the heating temperature of the reservoir portion 23 influences the particle diameter, it is natural that this heating temperature also influences particulate concentration. Thus, if heating is performed at a higher temperature, for example, approximately 900° C., it can be easily expected that a straight line which has a greater inclination than the straight line shown in FIG. 4 is obtained according to an increase in the number of times by which traverse is performed.

However, the intercept did not become 0 (zero).

Additionally, the intercept at this time is approximately equal to the minimum value of the percentages of the refractive index change in the above-described Examples 1 to 4 and Comparative Example 1 as shown by the auxiliary line in FIG. 3.

This fact is not contradictory to the study in the previously mentioned Comparative Example 1 in which the gaseous phase thermal oxidation reaction in which potassium chloride is oxidized to potassium oxide does not proceed at a heating temperature of 1100° C. or lower.

That is, in heating of 1100° C. or lower, potassium chloride is not oxidized in gaseous phase, and is deposited and adsorbed in proportion to the area of the inner wall of the glass tube section 1, and a certain amount of potassium chloride is dispersed in glass to give a change in refractive index while being oxidized to potassium oxide due to heating in the post collapsing process.

In contrast, in heating of 1300° C. or higher, it is believed that the potassium chloride particles are oxidized to potassium oxide in gaseous phase, and the reaction proceeds almost in conformity with the mechanism of thermo-oxidative decomposition and oxide deposition in the general MCVD method.

Example 7

The temperature of the dry oxygen which flows into the glass tube section 1 was set to 80° C., the temperature of the reservoir portion 23 was set to approximately 780 to 850° C. (higher than the melting point by approximately 100° C. or lower), and a glass preform was manufactured similarly to Example 1.

Example 8

The temperature of the dry oxygen which flows into the glass tube section 1 was set to 120° C., and a glass preform was manufactured similarly to Example 7.

Next, an experiment was performed by lowering the temperature of the reservoir portion 23 and changing the temperature of the dry oxygen such that the vapor of potassium chloride generated by the heating was cooled.

As a result, similarly to Example 6, scattering of light was hardly observed in the gaseous phase which flows into the inside of the composite glass tube.

It is considered that potassium chloride is carried as particles with a particle diameter of approximately 100 nm or less.

Additionally, the refractive index change of the glass in which potassium oxide was doped coincided with the result in the case of Example 6 where the number of times by which traverse was performed was 3 times within a range of variation of the plot shown in FIG. 3.

Compared to the temperature of the vaporisation of potassium chloride by the heating using the first oxyhydrogen burner 5, it is believed that the potassium chloride particles with a particle diameter of 100 nm or less are formed by cooling the potassium chloride vapor by the dry oxygen of a sufficiently low temperature.

Example 9

A glass preform was manufactured similarly to Example 1, using potassium bromide (KBr) instead of potassium chloride.

Example 10

A glass preform was manufactured similarly to Example 1, using sodium chloride (NaCl) instead of potassium chloride.

As shown in FIG. 5, since the melting points of potassium bromide and sodium chloride are comparable to that of potassium chloride and the chemical properties are also alike, glass preforms were manufactured under the same conditions as Example 1.

The refractive index profile of the produced glass rods was measured by a preform analyzer.

The percentages of the refractive index change with respect to the refractive index of pure silica of the central portion of the glass rod produced in Comparative Example 2 were 0.012±0.003% and approximately 0.010±0.003%.

The addition concentrations of potassium oxide and sodium oxide calculated using the proportional factors $+1.8 \times 10^{-3}$ and $+1.5 \times 10^{-3}$ [Δ/mol %] of the refractive index change caused by the addition of potassium oxide and sodium oxide reported in Non-patent Document (J. Schroeder, J. Non-Cryst., Solids, Vol. 40, p. 549 (1980)) were 0.009±0.003 [mol %] and 0.009±0.003 [mol %], respectively.

All the results were almost the same as the results of Example 1 produced using potassium chloride.

In the above-described examples or comparative examples, the manufacturing apparatus and method used in order to manufacture a rod-shaped glass to which alkali metal oxide is added using a glass tube made of pure synthetic silica, have been described in detail.

On the other hand, since a core preform onto which alkali metal oxide is added can be manufactured if a glass tube having a desired refractive index profile instead of the above glass tube is used, the invention can be applied to a method for manufacturing an optical fiber preform.

Additionally, if a glass material having a desired shape is used instead of the above glass tube, the invention can also be used for the manufacture of various glasswares, for example, lenses or window glass.

While preferred embodiments of the invention have been described and illustrated above, it should be understood that these are exemplary of the invention and are not to be considered as limiting.

Additions, omissions, substitutions, and other modifications can be made without departing from the scope of the present invention.

Accordingly, the invention is not to be considered as being limited by the foregoing description, and is only limited by the scope of the appended claims.

INDUSTRIAL APPLICABILITY

The manufacturing apparatus and method of the invention can be applied particularly to the manufacture of a glass preform appropriate to production of low-loss optical fibers.

What is claimed is:

1. A method for manufacturing a glass preform, the method comprising:
   preparing a dummy tube section and a glass tube section, the dummy tube section having a first end and a second end opposite to the first end, the glass tube section having an inner wall and being provided at the second end of the dummy tube section;
   arranging an alkali metal compound or an alkaline earth metal compound in the dummy tube section;
   heating and vaporizing the alkali metal compound or the alkaline earth metal compound at a predetermined temperature using a first heat source;
   allowing a dry gas containing oxygen to flow into the dummy tube section from the first end of the dummy tube section;
   cooling and condensing vapor of the alkali metal compound or the alkaline earth metal compound with movement of the dry gas in the dummy tube section, and thereby generating particles of the alkali metal compound or the alkaline earth metal compound;
   heating the particles of the alkali metal compound or the alkaline earth metal compound carried to the glass tube section with the movement of the dry gas by use of a second heat source which performs traverse; and
   making oxides of the alkali metal compound or the alkaline earth metal compound be deposited on the inner wall of the glass tube section and dispersed inside the glass tube section.

2. The method for manufacturing a glass preform according to claim 1, wherein
   the vapor of the alkali metal compound or the alkaline earth metal compound is cooled to the melting point or lower thereof.

3. The method for manufacturing a glass preform according to claim 1, wherein
   a particle diameter of the particles is less than or equal to 100 μm.

4. The method for manufacturing a glass preform according to claim 1, wherein
   the alkali metal compound or the alkaline earth metal compound is halide.

5. The method for manufacturing a glass preform according to claim 4, wherein
   the halide is either chloride or bromide.

6. The method for manufacturing a glass preform according to claim 5, wherein
   the chloride is either potassium chloride or sodium chloride.

7. The method for manufacturing a glass preform according to claim 5, wherein
   the bromide is potassium bromide.

8. The method for manufacturing a glass preform according to claim 1, wherein
   the alkali metal compound is potassium chloride, a dry gas heated at 80° C. to 120° C. is allowed to flow into the dummy tube section, and the predetermined temperature is approximately 100° C. higher than the melting point of the potassium chloride, and the particles are heated at temperature in the range of 1100° C. to 1850° C.

9. The method for manufacturing a glass preform according to claim 1, further comprising:
   allowing a source gas containing $SiCl_4$ with or without a dopant gas to flow into the glass tube section;
   depositing $SiO_2$ with or without a dopant on the inner wall of the glass tube section by heating a part of the glass tube section such that the glass tube section includes a cladding layer having a refractive index to be formed on an inner peripheral of the glass tube section so as the cladding layer come into directly adjacent with the inner wall of the glass tube section and a core layer having a refractive index that is greater than the refractive index of the cladding layer to be formed at a position of an inner periphery of the glass tube section so as to come into directly adjacent with the cladding layer.

* * * * *